United States Patent
Akram

(10) Patent No.: US 10,786,849 B2
(45) Date of Patent: Sep. 29, 2020

(54) SYSTEMS AND METHODS FOR PERFORMING MICROSTRUCTURE SIMULATION AND IMPLEMENTATION OF ADDITIVE MANUFACTURING PROCESSES

(71) Applicant: ANSYS, INC., Canonsburg, PA (US)

(72) Inventor: Javed Akram, Salt Lake City, UT (US)

(73) Assignee: ANSYS, INC., Canonsburg, PA (US)

( * ) Notice: Subject to any disclaimer, the term of this patent is extended or adjusted under 35 U.S.C. 154(b) by 22 days.

(21) Appl. No.: 16/294,718

(22) Filed: Mar. 6, 2019

(65) Prior Publication Data

US 2019/0275585 A1    Sep. 12, 2019

Related U.S. Application Data

(60) Provisional application No. 62/639,554, filed on Mar. 7, 2018.

(51) Int. Cl.
| | |
|---|---|
| B22F 3/10 | (2006.01) |
| B22F 3/105 | (2006.01) |
| B22F 1/00 | (2006.01) |
| G06F 17/50 | (2006.01) |
| G06F 30/23 | (2020.01) |
| B33Y 70/00 | (2020.01) |
| B33Y 10/00 | (2015.01) |
| B33Y 30/00 | (2015.01) |
| B33Y 50/02 | (2015.01) |

(52) U.S. Cl.
CPC ......... B22F 3/1028 (2013.01); B22F 1/0059 (2013.01); B22F 3/1055 (2013.01); G06F 30/23 (2020.01); *B22F 2003/1057* (2013.01); *B33Y 10/00* (2014.12); *B33Y 30/00* (2014.12); *B33Y 50/02* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 10,353,378 B2 * | 7/2019 | Shapiro | G05B 19/4099 |
| 2013/0218538 A1 * | 8/2013 | Fuecker | G06F 30/23 |
| | | | 703/2 |
| 2014/0324204 A1 * | 10/2014 | Vidimce | B29C 64/386 |
| | | | 700/98 |
| 2015/0037775 A1 * | 2/2015 | Ottensmeyer | G09B 23/30 |
| | | | 434/271 |

(Continued)

OTHER PUBLICATIONS

Akram, J., et al., "Understanding grain evolution in additive manufacturing through modeling," Elsevier, Additive Manufacturing, vol. 21, May 2018, pp. 255-268.

(Continued)

*Primary Examiner* — Ramesh B Patel
(74) *Attorney, Agent, or Firm* — Womble Bond Dickinson (US) LLP

(57) ABSTRACT

Systems and methods are provided for receiving, by a simulation model, a thermal gradient and a cooling rate associated with a 3D printing material as inputs for the simulation model. The systems and methods further include generating, by the simulation model executed by a processing system, characteristics associated with the 3D printing material as outputs of the simulation model based on the thermal gradient and the cooling rate associated with the 3D printing material.

20 Claims, 11 Drawing Sheets

(56) References Cited

U.S. PATENT DOCUMENTS

| | | | |
|---|---|---|---|
| 2018/0095450 A1* | 4/2018 | Lappas | B33Y 30/00 |
| 2018/0133801 A1* | 5/2018 | Buller | B23K 26/032 |
| 2018/0275636 A1* | 9/2018 | Zhao | G05B 19/4099 |
| 2018/0314235 A1* | 11/2018 | Mirabella | B33Y 50/00 |

OTHER PUBLICATIONS

Rodgers, T. M., et al., "Simulation of metal additive manufacturing microstructures using kinetic Monte Carlo," Elsevier, Computational Materials Science, vol. 135, Jul. 2017, pp. 78-89.

* cited by examiner ations and simulation of an additive manufacturing process (e.g., a 3D printing process). The simulation may include simulation of the microstructure of an article fabricated by the additive manufacturing process. The systems and methods as described herein may be performed prior to initiation of an additive manufacturing process to determine a likelihood that the manufactured article will be within desired specifications. The systems and methods may further generate characteristics, such as the orientation and composition, of a 3D printing material, and concentrations of different components in the 3D printing material, used in an additive manufacturing process based on a thermal gradient and cooling rate associated with the 3D printing material.

SYSTEMS AND METHODS FOR PERFORMING MICROSTRUCTURE SIMULATION AND IMPLEMENTATION OF ADDITIVE MANUFACTURING PROCESSES

CROSS-REFERENCE TO RELATED APPLICATION

This application claims priority to U.S. Provisional Application No. 62/639,554, filed Mar. 7, 2018, which is hereby incorporated by reference in its entirety.

FIELD

This disclosure is related generally to additive manufacturing and more particularly to microstructure simulation and implementation of additive manufacturing processes.

BACKGROUND

Additive manufacturing, such as 3-dimensional (3D) printing, is a process in which material is joined or solidified using a computer control system to generate a manufactured article using a 3D printing material, such as liquid molecules or powder grains.

During the 3D printing process, an energy source provides a beam to a scanner, which focuses the beam on a portion of the 3D printing material. The scanner focuses the beam (e.g., from a laser) on a desired area of the 3D printing material, melting the 3D printing material to transform the 3D printing material from a solid state to a liquid state. Once the beam is removed from the desired area, the 3D printing material cools and solidifies. This process may be performed iteratively using the layer by layer process to generate the manufactured article.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
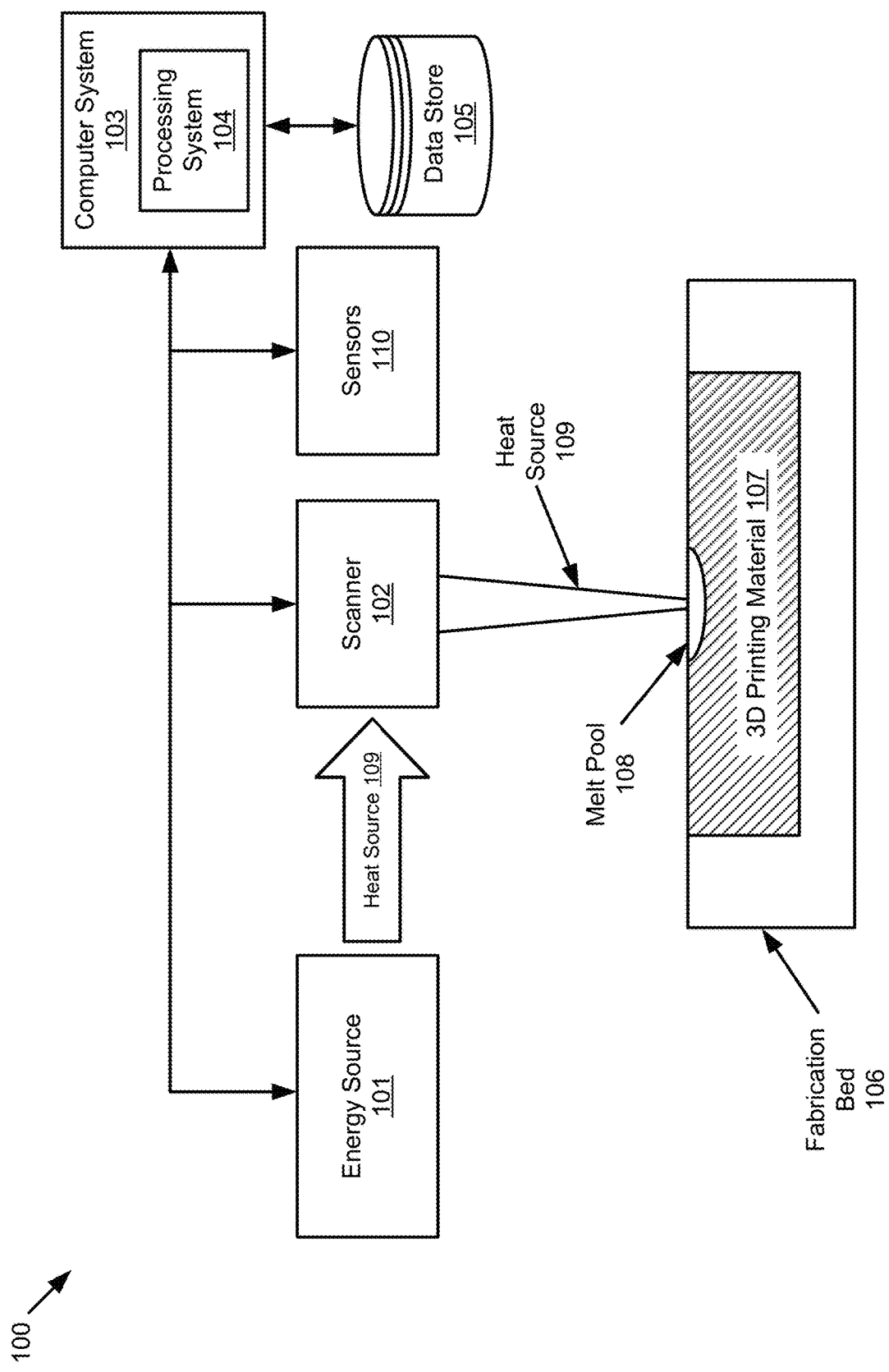
FIG. 1 is an example 3-dimensional (3D) printing system in accordance with embodiments of the disclosure.

Systems and method as described herein provide analysis and simulation of an additive manufacturing process (e.g., a 3D printing process). The simulation may include simulation of the microstructure of an article fabricated by the additive manufacturing process. The systems and methods as described herein may be performed prior to initiation of an additive manufacturing process to determine a likelihood that the manufactured article will be within desired specifications. The systems and methods may further generate characteristics, such as the orientation and composition, of a 3D printing material, and concentrations of different components in the 3D printing material, used in an additive manufacturing process based on a thermal gradient and cooling rate associated with the 3D printing material.

Conventional simulations of an additive manufacturing process may be capable of generating characteristics associated with an article fabricated by an additive manufacturing process. However, conventional simulations do not utilize the thermal gradient and cooling rate associated with the 3D printing material as inputs to determine the characteristics associated with the 3D printing material and concentrations of components in the 3D printing material. Furthermore, the number of characteristics a conventional simulation generates is limited. For example, a conventional simulation may be able to determine a grain size of a 3D printing material, but may not be able to determine the composition and/or orientation of the 3D printing material. Because the number of characteristics of a conventional simulation is limited, the ability for the conventional simulation to accurately predict the likelihood that a manufactured article will be within specifications is reduced. The reduced accuracy of a conventional simulation may result in an increased number of articles manufactured using an additive manufacturing process being outside of the specifications. Furthermore, a conventional simulation model can only generate characteristics on a small scale and, therefore, are limited to small scale simulations.

Aspects of the present disclosure address the above and other deficiencies by providing a simulation model that utilizes a thermal gradient and cooling rate associated with a 3D printing material to generate characteristics associated with the 3D model. Parameters associated with the 3D printing material and the 3D printing process can be used to determine a thermal gradient and cooling rate associated with the 3D printing material during the 3D printing process. The thermal gradient can include a representation of temperature variation across a volume (in 3D space) of the 3D printing material, after the 3D printing material has been heated, based on the composition of the 3D printing material. The thermal gradient and cooling rate associated with the 3D printing material are used by a thermal solver application to generate melt pool dimensions. The melt pool dimensions may be used to set melt pool boundaries for different planes of the manufactured article. For example, in a 3D plane utilizing Cartesian coordinates (e.g., X, Y, and Z axes), one or more melt pool boundaries may be set for the XY plane, the YZ plane and/or the XZ plane.

Upon setting the melt pool boundaries, a 3D printing system begins performing nucleation on the 3D printing material based on a nucleation rate at the melt pool boundaries to transform the 3D printing material from a liquid state to a solid state. During nucleation, new nuclei (e.g., grains of the 3D printing material) populate at the melt pool boundaries. The nucleation rate at the melt pool boundaries is determined based on the thermal gradient and cooling rate of the 3D printing material. A growth orientation is assigned to the new nuclei populating at the melt pool boundaries, which corresponds to an angle of the nuclei relative to the movement and position of the beam involved in performing nucleation on the 3D printing material.

Once the growth orientations are assigned to the new nuclei, a concentration field for the 3D printing material is determined. The solid fraction between 0 and 1 (e.g., 0 for liquid and 1 for solid) is used to identify interface cells during the 3D printing process. The interface cells are cells of 3D printing material that are positioned between solid cells of 3D printing material and liquid cells of 3D printing material. Once the interface cells have been identified, the velocities of the interface cells are determined which are used to calculate the solid fraction of interface cells. The simulation model then determines if all the cells of 3D printing material are solid. If all of the cells of the 3D printing material are not solid, then the above process is repeated until no liquid cells of the 3D printing material remain. If all of the cells of the 3D printing material are solid, then the simulation model generates characteristics associated with the microstructure of the 3D printing material. For example, based on the above process, the simulation model may identify a composition of the 3D printing material and/or an orientation of the 3D printing material and/or concentrations of the 3D printing material.

By generating the characteristics, such as the composition and orientation of the 3D printing material and a set of concentrations of different components in the 3D printing materials, using the thermal gradient and cooling rate associated with the 3D printing material, the simulation model is able to more accurately simulate the behavior of the 3D printing material during the 3D printing process to produce a manufactured article. Accordingly, the simulation model is able to more accurately determine whether a 3D printing process will produce a manufactured article that is within the desired specification. If the simulation model determines that the 3D printing process will not produce the manufactured article within the desired specification, parameters of the 3D printing process may be adjusted and the simulation process may be repeated until the simulation model determines that the 3D printing process will produce the manufactured article within the desired specification, improving the performance of the 3D printing system. Furthermore, the simulation model is capable of simulating characteristics on a larger scale than conventional simulation models, further improving the performance of the simulation model.

Although described for utilization in an additive manufacturing process, embodiments of the disclosure may be applicable for all processes which involve heating and cooling, such as elective laser melting, electron beam melting, direct energy deposition and welding and joining. Further information, from the inventor, about aspects and embodiments of this disclosure can be found in a publication from the inventor that was available "online" on Mar. 20, 2018. This publication is incorporated herein by reference and is Javed Akram, et al., "Understanding grain evolution in additive manufacturing through modeling", Additive Manufacturing 21 (2018) 255-268.

FIG. 1 is an example 3-dimensional (3D) printing system 100 in accordance with embodiments of the disclosure. The 3D printing system 100 includes an energy source 101 that is operatively coupled to a scanner 102. The energy source 101 provides a heat source 109 to the scanner 102. In some embodiments, the energy source 101 may be a laser source that generates and provides a laser beam to scanner 102. In some embodiments, the energy source 101 may generate and provide an energy source, such as an electron beam, to scanner 102. In embodiments, 3D printing system 100 may include one or more energy sources 101 that may each generate one or more heat sources 109.

The scanner 102 may receive the heat source 109 from the energy source 101 and may focus the heat source 109 on a desired area of the 3D printing material 107 using one or more mirrors and/or lensing optics. The 3D printing system may also include one or more sensors 110 for gathering data associated with the 3D printing process. For example, the sensors 110 may include one or more cameras, temperature sensors and/or other sensors to scan the 3D printing material 107 and gather data associated with the 3D printing process.

The energy source 101, the scanner 102 and the sensors 110 may be operatively coupled to a computer system 103. The computer system 103 includes a processing system 104 that is made up of one or more processors. The computer system 103 may further include a data store 105. Data store 105 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The computer system 103 may provide directions associated with a 3D printing process to the energy source 101, the scanner 102 and/or sensors 110. The computer system 103 may receive data from the energy source 101, the scanner 102 and/or the sensors 110 associated with a 3D printing process and utilize the data in a simulation model, as will be described in further detail below.

The 3D printing system 100 includes a fabrication bed 106 which is designed to contain the 3D printing material 107 during the 3D printing process. The 3D printing material 107 may be a powder made up of grains of material, such as a metal or metallic alloy. When the heat source 109 is focused on an area of the 3D printing material 107, the heat generated by the heat source 109 causes a portion of the grains of the 3D printing material 107 to transform from a solid state to a liquid state and bind with one another to form a melt pool 108. The melt pool 108 may include the grains of the 3D printing material 107 that have transformed into a liquid state. When the heat source 109 is removed from the area of the 3D printing material 107, the melt pool 108 may begin to cool and eventually solidify into a solid material. A subsequent layer of 3D printing material 107 may then be deposited over the solidified melt pool, and the above process is repeated. This process may be performed on a layer by layer basis to form a manufactured article by selectively melting portions of the 3D printing material 107 at each layer that correspond to the desired geometry of the article.

Figure 2:
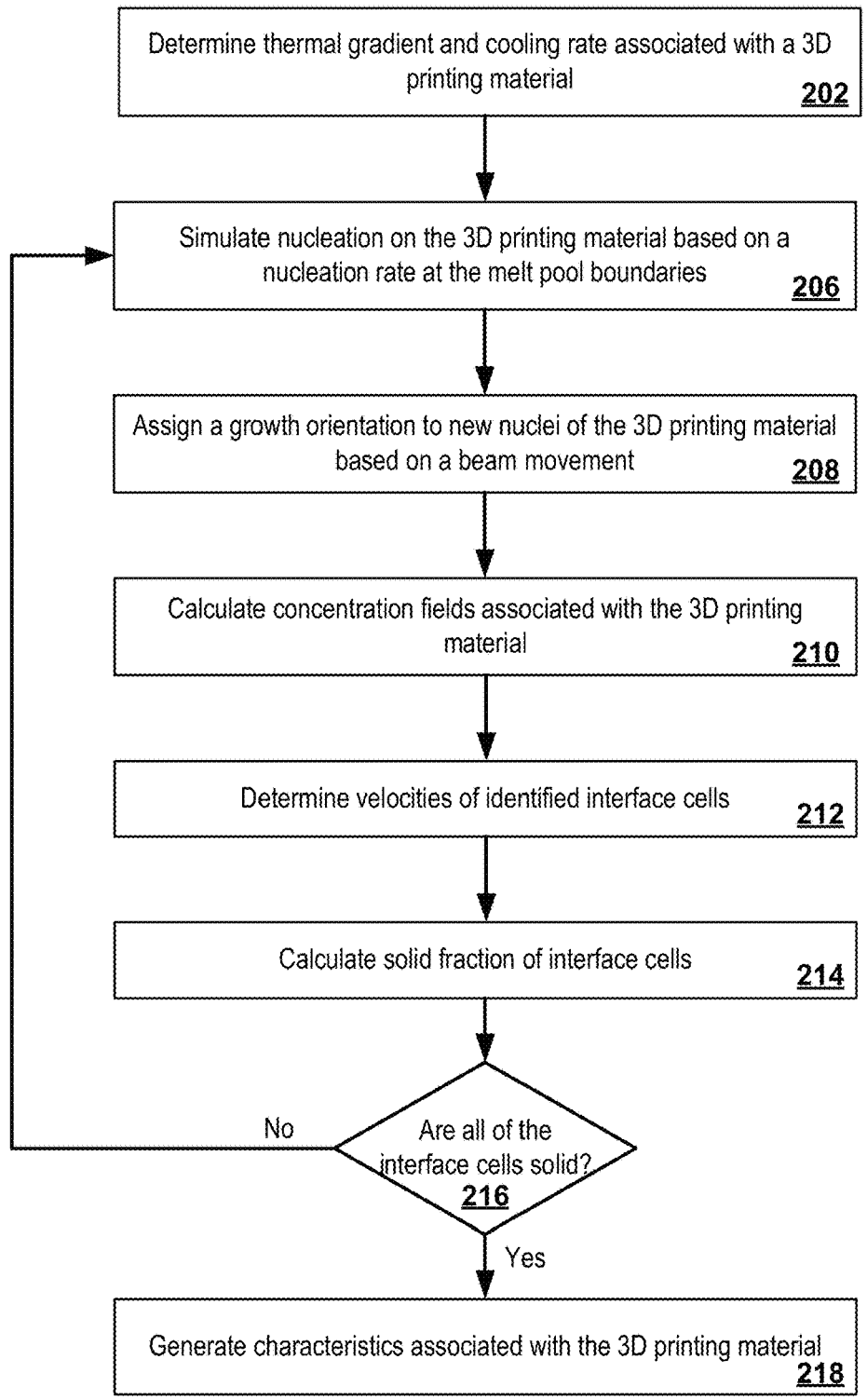
FIG. 2 is a flow diagram of a method of generating characteristics of a 3D printing material based on a thermal gradient and cooling rate associated with the 3D printing material in accordance with some embodiments of the disclosure.

FIG. 2 is a flow diagram of a method 200 of generating characteristics of a 3D printing material based on a thermal gradient and cooling rate associated with the 3D printing material, in accordance with some embodiments of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof In embodiments, aspects of method 200 may be performed by computer system 103 of FIG. 1.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

Method 200 may begin at block 202 with the processing logic determining a thermal gradient and cooling rate associated with a 3D printing material. The thermal gradient may correspond to a distribution of temperature over an area of the 3D printing material. The cooling rate may correspond to the rate at which the temperature of the 3D printing material decreases over time. The cooling rate value may correspond to an average value for a given volume of the manufactured article or the cooling rate may be determined for each scan line of the manufactured article. The thermal gradient and cooling rate of the 3D printing material may be determined based on parameters associated with the 3D printing material and the 3D printing process. Examples of parameters that may be utilized to determine the thermal gradient and the cooling rate of the 3D printing material include, but are not limited to, heat source power/temperature, movement speed of the heat source, composition of the 3D printing material, geometry of an article, etc. In embodiments, the thermal gradient and cooling rate may be determined by a thermal solver application executed by a processing system. The thermal solver may use the parameters associated with the 3D printing process and/or the 3D printing material as inputs to determine the thermal gradient and cooling rate. An example of a thermal solver is the Thermal Solver computer program available in Ansys Additive from Ansys Inc. of Canonsburg, Pa.

At block 206, the processing logic simulates nucleation on the 3D printing material (e.g. performed in a 3D printing system) based on a nucleation rate at the melt pool boundaries. The processing logic may simulate nucleation according to the energy source of the 3D printing system generating a heat source and directing the scanner to focus the heat source on a particular area of the 3D printing material. The heat source may heat the 3D printing material, causing the 3D printing material to transform from a solid state into a liquid state. During the beginning of the nucleation process, new nuclei of 3D printing material (e.g., representing grains of 3D printing material) that has cooled and transitioned back into a solid state will populate at the melt pool boundaries, as will be described in further detail below. To determine the nucleation rate (e.g., the rate at which new nuclei populate) at the melt pool boundaries, the following equation may be used:

$$\frac{\partial N}{\partial t} = -2\mu_N(\Delta T)\frac{\partial T}{\partial t}(1-f_s)$$

where N is the number of nuclei, ΔT is the thermal gradient/total bulk undercooling, $$\frac{\partial T}{\partial t}$$

is the cooling rate, $\mu_N$ is the nucleation parameter and $f_s$ is the fraction of solid. As can be seen by inspection of the above equation, the cooling rate is utilized to determine the nucleation rate, which controls the microstructure simulation for the 3D printing material.

At block 208, the processing logic assigns a growth orientation to the new nuclei of the 3D printing material located at the melt pool boundaries based on a heat source movement. The heat source movement corresponds to the movement of the heat source generated by the energy source along the surface of the bed of 3D printing material. The growth orientation may correspond to an angle between a location of the new nuclei relative to the location of the heat source at any time during the 3D printing process. The assignment of growth orientation to the new nuclei will be discussed in further detail below at FIG. 8.

At block 210, the processing logic calculates concentration fields associated with the 3D printing material. A concentration field may correspond to the diffusion of the solid and liquid portions of a 3D printing material across an area of the 3D printing material. The concentration fields may be determined utilizing the following strong form partial differential equation:

$$\frac{dC}{dT} = D\left(\frac{d^2C}{dx^2} + \frac{d^2C}{dy^2} + \frac{d^2C}{dz^2}\right) + C(1-k)\frac{df_s}{dt}$$

Where D is the diffusivity of solute atom in solvent, which corresponds to the chemistry of a grain of the 3D printing material, as a function of the liquid or solid state of the 3D printing material, C is the concentration of a solute, k is the partition coefficient which is a materials constant, and (x,y,z) are spatial coordinates. The second term on the right-hand side of the equation $$\left(\text{e.g., } C(1-k)\frac{df_s}{dt}\right)$$

may correspond to the amount of solute rejection during the solidification of the 3D printing material at the interface cells.

At block 212, the processing logic determines velocities of identified interface cells. The velocities of the interface cells may correspond to how fast the identified interface cells are moving. The interface cells may correspond to a determined volume of the 3D printing material that is located between the solid and liquid portions of the 3D printing materials. For example, a grid may be transposed over a volume of 3D printing material, where each square of the grid is a cell. The interface cells may be one or more squares of the grid that include some 3D printing material in a solid state and some 3D printing material in a liquid state. The interface cells may be identified based on the solid fraction, as will be discussed in further detail at FIG. 9 below. The velocities for the identified interface cells may be determined using the following equation:

$$V_N = \mu_k(\Delta T_T + \Delta T_C + \Delta T_K)$$

where $\mu_k$ is the interface kinetic coefficient and $\Delta T_T$, $\Delta T_C$, and $\Delta T_K$ are thermal, constitutional, and curvature undercooling, respectively. After expanding, the previous equation can be expressed as follows:

$$\Delta T = [\Delta T_T + m_l(C_l - C_o) - \Gamma \overline{K}(t_n)] \quad (4)$$

where $\Delta T_T$ is determined from thermal gradient; $m_l$, $C_l$, and $C_o$ are liquidous slope (materials constant), actual liquid composition at solid/liquid interface cells during solidification, and initial composition of solute atom, respectively. The $C_l$ (actual composition) at the solid liquid interface cells is obtained by solving solute conservation equation which is explained at block 210. $\Gamma$ is the Gibbs Thomson coefficient (materials constant), and $\overline{K}(t_n)$ is the mean curvature which is calculated according to following equation:

$$\overline{K} = \frac{1}{l_c}\left(1 - 2\frac{f_s + \sum_{i=1}^{N} f_s(i)}{N+1}\right)$$

where $l_c$ is the size of the cell and N is the total number of neighbor cells (e.g., 8 in two dimensions and 26 in three dimensions). To account for thermodynamic and kinetic anisotropy, the Gibbs-Thomson coefficient $\Gamma$ and crystal growth velocity ($V_g$) according to the crystal preferential growth direction ($\theta_o$) explained at block 218, can be calculated using following equations:

$$\Gamma = \Gamma\{1 - \delta_t \cos[4(\theta - \theta_o)]\}$$

$$V_g = V_N\{1 + \delta_k \cos[4(\theta - \theta_o)]\}$$

where $\delta_t$ and $\delta_k$ are the degree of thermodynamic and kinetic anisotropy (materials constant), respectively and $\theta$ is the normal angle between the horizontal direction and solid/liquid interface. The angle $\theta$ is obtained from the gradient of solid fraction at the solid liquid interface.

At block 214, the processing logic calculates a solid fraction of the interface cells using following relationship:

$$\Delta f_s = \frac{V_g}{l_c}\Delta t$$

where $\Delta t$ is the time increment and $l_c$ is the length/size of the cell. The solid fraction may range in between 0 to 1. For example, a solid fraction value of 0.1 may indicate that 10% of the given interface cell is in a solid state, while the remaining 90% of that interface cell is in a liquid state. Once the solid fraction values for the interface cells reach a value of 1, the identified interface cells will no longer be considered interface cells.

At block 216, the processing logic determines if all of the interface cells are in a solid state. The processing logic may determine that all of the interface cells are in a solid state based on the solid fraction determined at block 214. For example, if the solid fractions for all of the interface cells have achieved a value of 1, then the processing logic determines that all of the interface cells are in a solid state. However, if the solid fraction of any of the interface cells has a value of less than 1, then the processing logic determines that not all of the interface cells are in a solid state. If the processing logic determines that all of the interface cells are not in a solid state, method 200 returns to block 206 and the process is repeated. In embodiments, a time increment for the repeating of the process may be determined based on the length of each cell of 3D printing material divided by the maximum velocity of the cells, as determined at block 212.

If the processing logic determines that all of the interface cells are in a solid state, at block 218, the processing logic generates characteristics associated with the 3D printing material for a scan line in a layer. The generated characteristics may be associated with the microstructure of the manufactured article. In embodiments, a generated characteristic associated with the 3D printing material may be the composition of the 3D printing material. For example, the processing logic may determine that the composition of the 3D printing material is a particular aluminum alloy. The composition of the material corresponds to a spatial distribution of a solute element in a solvent of the 3D printing material based on the calculations previously described at block 210. For example in a case of nickel based alloys, Nickel is the solvent and other alloying elements are the solute. The spatial distribution of some solute elements in a solvent base is captured using a finite center difference scheme, second order partial differential equation as described at block 210. As can be seen by inspection of the above equation, the to the amount of solute rejection during the solidification of the 3D printing material at the interface cells is affected by solid fraction which is determined by the velocity of the interface cells. As previously described, the velocity of the interface cells are determined using the thermal gradient associated with the 3D printing material. Furthermore, the nucleation rate, which utilizes the cooling rate and thermal gradient, decides the number of grains in the system and affects the composition of the 3D printing material.

In some embodiments, a generated characteristic associated with the 3D printing material may be the orientation of the 3D printing material. The orientation associated with the 3D printing material may correspond to the behavior of the 3D printing material with respect to the heat source generated by the energy source. The orientation of the 3D printing material is allotted during the simulation of the nucleation of the 3D printing material based on the location of the heat source, as previously described at block 208. Each grain of the 3D printing material may have an assigned orientation value that corresponds to a direction of growth of the 3D printing material during nucleation. Accordingly, the orientation of the 3D printing material may correspond to the spatial distribution of the orientation of the grains of the 3D printing material.

In some embodiments, a generated characteristic may be a grain size of the 3D printing material. In embodiments, the grain size of the 3D printing material may be determined for each scan line simulated by the simulation model, or the grain size may be determined after all scan lines of the manufactured article have been simulated by the simulation model. Using the assigned orientation to the grains of 3D printing material, the diameter is determined for each grain by fitting an area of each grain to an area of a circle. In embodiments, an average grain size may be generated for the grains of the 3D printing material.

In embodiments, the generated characteristic may be the grain morphology or structure (e.g., microstructure) of the 3D printing material. The grain morphology may correspond to the overall distribution of the grains over a volume of the 3D printing material, which is determined based on the assigned orientations to the grains of the 3D printing material, as previously described.

In some embodiments, at least a portion of method 200 for simulating the microstructure of a manufactured article may be performed on at least two layers of the manufactured article. In one embodiment, the method 200 can be performed for each layer in a set of layers that define a volume in space of the 3D printing material that is converted into the manufactured article. By performing at least a portion of method 200 on at least two layers of the manufactured article, the processing logic may capture data associated with the re-melting (e.g., transformed from a solid state to a liquid state) of the 3D printing material. For example, while performing at least a portion of method 200 on the second layer of the manufactured article, the processing logic may capture data associated with the 3D printing material in the first layer that is re-melted as a result of the heat generated by the fabrication of the second layer of the manufactured article.

In embodiments, the processing logic may receive input data based on real world measurements from a previously performed additive manufacturing process. For example, measurements may be made of structures involved in the additive manufacturing process (e.g., temperatures at different points in the process, speed of movement of components, etc.) Measurements may also be made of articles (e.g., the microstructure) of an additive manufacturing process. This real world data may be input into the simulation processes described herein to better inform the simulation of real world conditions. Moreover, the simulation process can start in a first simulation process with a first set of inputs (e.g., in block 202) to derive a first set of outputs (e.g., in block 218) and a second simulation process can be based on the first set of inputs that are revised given the characteristics in the first set of outputs. Thus, the simulation can be repeated with variations in the inputs that are informed by the prior outputs to change the characteristics of the manufactured article to match the desired specifications.

Figure 3:
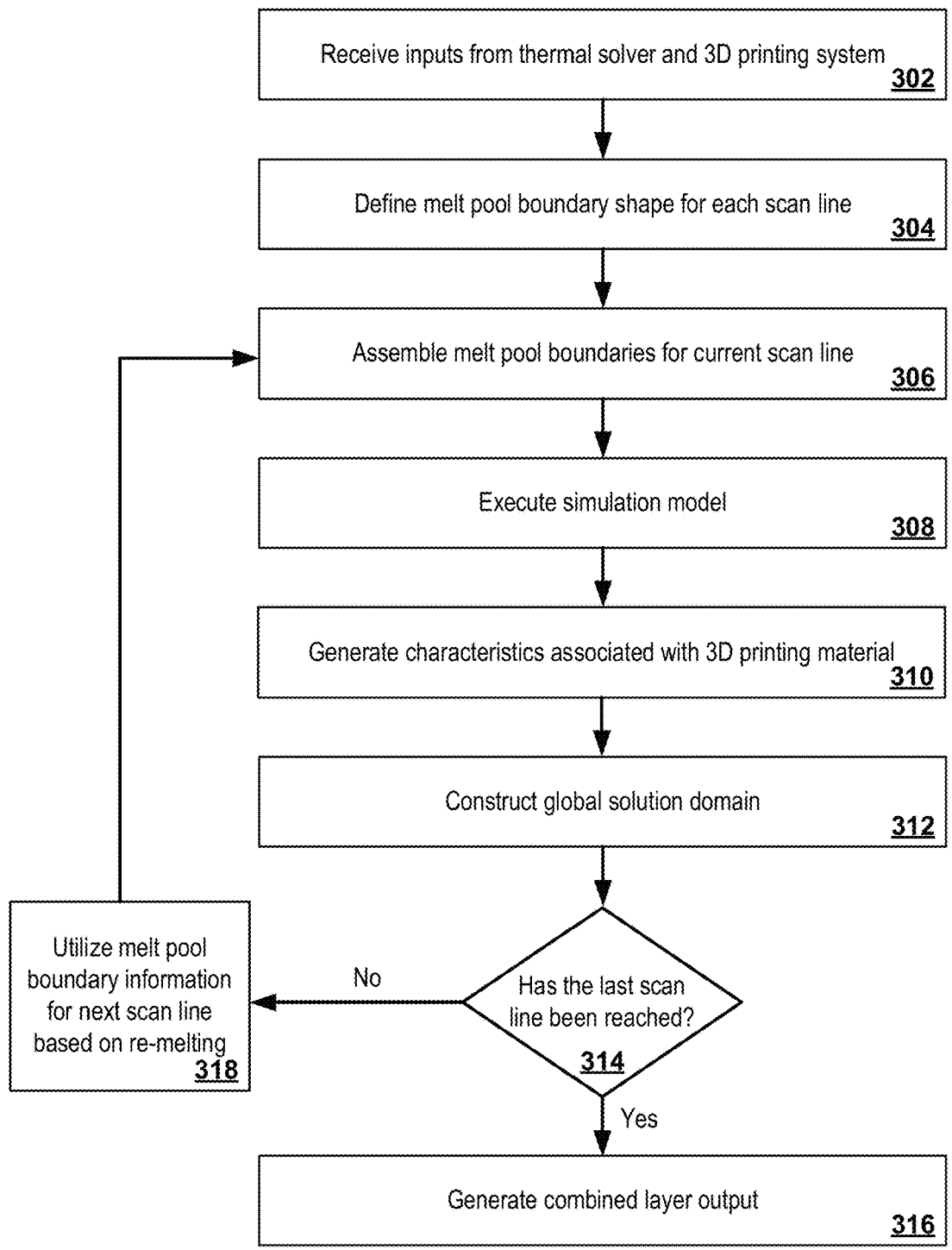
FIG. 3 is a flow diagram of a method of generating and modifying melt pool boundaries for scan lines of a 3D printing process in accordance with some embodiments of the disclosure.

FIG. 3 is a flow diagram of a method 300 of generating and modifying melt pool boundaries for scan lines of a 3D printing process in accordance with some embodiments of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by computer system 103 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 may begin at block 302 with the processing logic receiving inputs from a thermal solver application and a 3D printing system. The processing logic may receive the thermal gradient, cooling rate and melt pool boundary characteristics from the thermal solver, as previously described. The processing logic may receive information associated with the 3D printing system, such as the scan pattern, layer thickness, hatch spacing and/or heat source speed to be utilized by the 3D printing process. The scan pattern utilized by a 3D printing process may correspond to a pattern of scan lines formed by a moving heat source during the 3D printing process. The layer thickness may correspond to the thickness of a particular layer of a 3D printing process. The hatch spacing may correspond to a distance between adjacent scan lines of the scan pattern. The heat source speed may correspond to the speed the heat source travels along the surface of the 3D printing material during the 3D printing process. This speed can be controlled by a scan controller that controls the scan pattern and speed of the energy source, such as a laser beam.

At block 304, the processing logic defines melt pool shape of each scan line of the scan pattern. The melt pool shape may be defined based on the different planes of the manufactured article, the type of scan pattern used during the 3D printing process (e.g., layer thickness, hatch spacing, etc.) and the melt pool dimensions determined by the thermal solver application. For example, the melt pool shape may be defined based on a melt pool width and/or height determined by the thermal solver application. The shape of the melt pool may be elliptical in shape and the number of elliptical shape boundaries required to cover the surface area for one layer of a manufactured article may be determined based on the melt pool width and hatch spacing of the scan pattern. The number of elliptical shape boundaries can then be multiplied by the total number of layers required to form the manufactured article to determine the total number of elliptical shape boundaries for a 3D printing process to fabricate the manufactured article. The total number of layers required to form the manufactured article may be based on the height of the manufactured article divided by the layer thickness. Additional details with regards to defining melt pool boundaries will be described below. Additional details regarding the setting of melt pool boundaries on different planes will be described at FIGS. 5A-D below.

At block 306, the processing logic assembles melt pool boundaries for a current scan line of a scan pattern. The melt pool boundaries may be assembled based on the melt pool shape, the scan pattern and melt pool dimensions. Additional details regarding the assembly of melt pool boundaries will be discussed in further detail below.

At block 308, the processing logic executes a simulation model for the current scan line to generate characteristics associated with the 3D printing material, as previously described at method 200 of FIG. 2. At block 310, the processing logic generates characteristics associated with the 3D printing material for the current scan line.

At block 312, the processing logic may construct a global solution domain. The global solution domain may be a data structure that includes the output data for each of the scan lines of a scan pattern for a particular layer of the 3D printing process. As the simulation model is executed and characteristics are generated for each scan line of the scan pattern, the global solution domain data structure may be updated to include the newly generated characteristics for new scan lines. The global solution domain data structure may include information such as orientation, composition and other information associated with the 3D printing material and/or process for the particular layer of the 3D printing process.

At block 314, the processing logic determines if the last scan line of the scan pattern for the layer of the simulated 3D printing process has been reached. If the last line of the scan pattern for the layer of the simulated 3D printing process has been reached, at block 316, the processing logic generates a combined layer output that includes the generated characteristics and any other output data for the scan pattern for the particular layer of the 3D printing process.

If the last line of the scan pattern has not been reached, at block 318, the processing logic utilizes melt pool boundary information for the next scan line based on re-melting of the 3D printing material of the previous scan line. The melt pool boundary information may be used to modify the previously defined melt pool boundary shape and assembled melt pool boundaries based on the re-melting of the 3D printing material and based on the orientation and composition information for the current scan line. The melt pool boundary information may be utilized by the processing logic by identifying the characteristics associated with the previous scan line that are stored at the global solution domain data structure. From block 318, the process repeats for the next scan line by reverting back to block 306, as shown in FIG. 3. The processes of FIGS. 2 and 3 can be repeated for all scan lines for a layer and then repeated for one or more additional layers.

Figure 4:
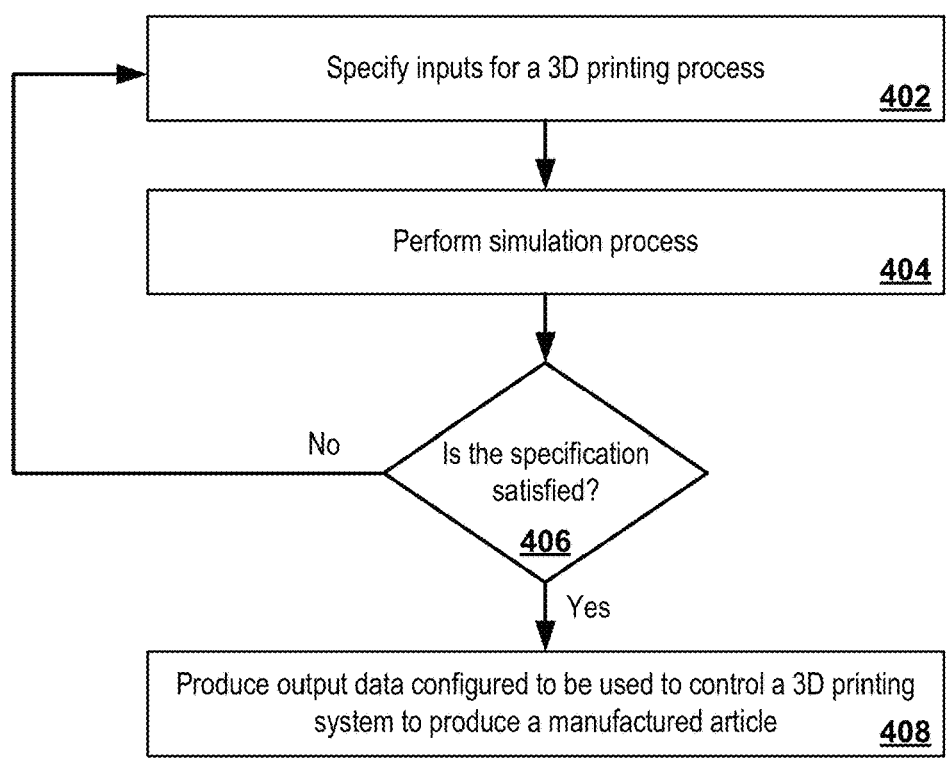
FIG. 4 is a flow diagram of a method of controlling a 3D printing process to fabricate a manufactured article within a desired specification in accordance with some embodiments of the disclosure.

FIG. 4 is a flow diagram of a method 400 of controlling a 3D printing process to fabricate a manufactured article within a desired specification in accordance with some embodiments of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof In embodiments, aspects of method 400 may be performed by computer system 103 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 may begin at block 402 with the processing logic specifying inputs for a 3D printing process. Examples of inputs of a 3D printing process include, but are not limited to, energy source power, heat source temperature, scan pattern, layer thickness, hatch spacing, melt pool boundaries or heat source speed. At block 404, the processing logic performs the simulation process, as previously described.

At block 406, the processing logic determines if a desired specification for a manufactured article is satisfied based on the outputs of the simulation process. The desired specification may be satisfied if the processing logic determines, based on the outputs of the simulation process, that the manufactured article will be within a desired specification for the manufactured article. For example, a desired specification may indicate one or more ranges of dimensions for the manufactured article that may include manufacturing tolerances. If the simulation determines, based on the generated characteristics, that the manufactured article is within the one or more ranges of dimensions, then the specification is satisfied.

If the desired specification is not satisfied, the processing logic may return to block 402 and specify new inputs for the simulation process. For example, if the desired specification is not specified, the processing logic may adjust the heat source speed, energy source power, scan pattern, etc. The simulation process may then be repeated until the desired specification is satisfied.

If the desired specification is satisfied, at block 408 the processing logic may produce output data configured to be used to control a 3D printing system to produce a manufactured article. For example, the processing logic may provide the parameters, such as energy source power, heat source speed, etc. to a 3D printing system, which are used to control the 3D printing process for the manufactured article.

Figure 5A:
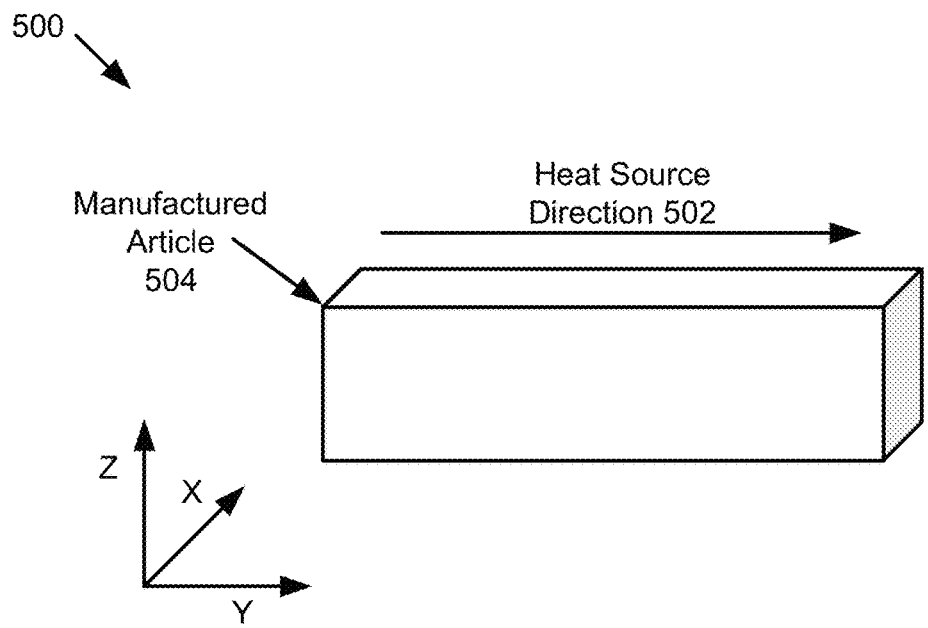
FIG. 5A is an illustration of an example of different planes of a manufactured article utilizing an additive manufacture process in accordance with embodiments of the disclosure.

FIG. 5A is an illustration 500 of an example of different planes of a manufactured article of an additive manufacture process in accordance with embodiments of the disclosure. Illustration 500 includes a manufactured article 504 that corresponds to a 3D object to be produced by an additive manufacturing process. The manufactured article 504 may be produced by applying a heat source generated by an energy source to a 3D printing material, as previously described. Illustration 500 further includes a heat source direction 502, which indicates the direction of the heat source generated by the energy source travels during the additive manufacturing process.

Different planes of the manufactured article 504 may be defined based on a 3D Cartesian coordinate system that utilizes X, Y and Z axes, as shown in illustration 500. For example, XY, YZ and XZ planes may be defined for the manufactured article 504. Melt pool boundaries may then be assigned to each of these different planes to form constraints on the melt pool in three dimensions during the additive manufacturing process, as will be described in further detail below. The melt pool boundaries may be assigned to the different planes based on a melt pool width and melt pool height that are determined by a thermal solver application, as previously described.

Figure 5B:
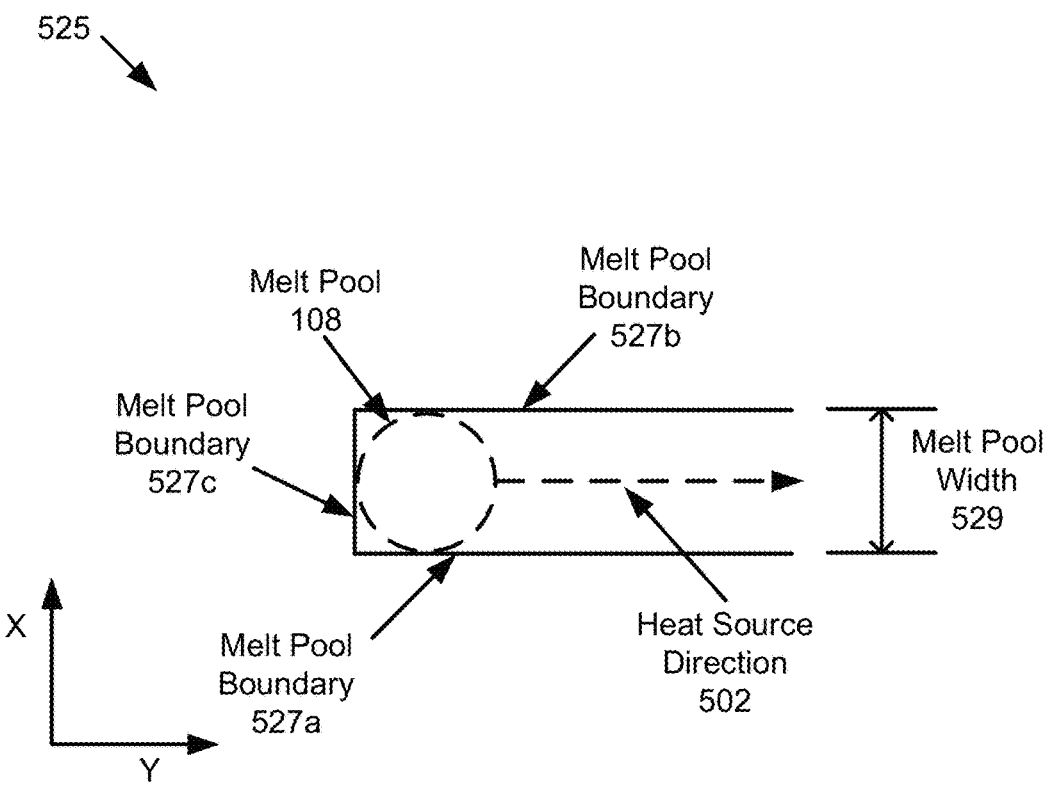
FIG. 5B is an illustration of an example of assigning melt pool boundaries to the XY plane of a manufactured article in accordance with embodiments of the disclosure.

FIG. 5B is an illustration 525 of an example of assigning melt pool boundaries to the XY plane of a manufactured article in accordance with embodiments of the disclosure. Based on melt pool width 529 that is determined by a thermal solver application, melt pool boundaries 527*a-c* are assigned to the XY plane of the manufactured article, where melt pool boundaries 527*a, b* are along the Y-axis of the manufactured article and melt pool boundary 527*c* is along the X-axis of the manufactured article. The melt pool boundaries 527*a-c* may indicate dimensional constraints for the melt pool 108 with respect to the XY plane during the additive manufacturing process. The 3D printing material of the melt pool 108 in a liquid state is to remain within melt pool boundaries 527*a-c*. For example, the melt pool 108 is not to go above melt pool boundary 527*b*, below melt pool boundary 527*a* and to the left of melt pool boundary 527*c*.

Figure 5C:
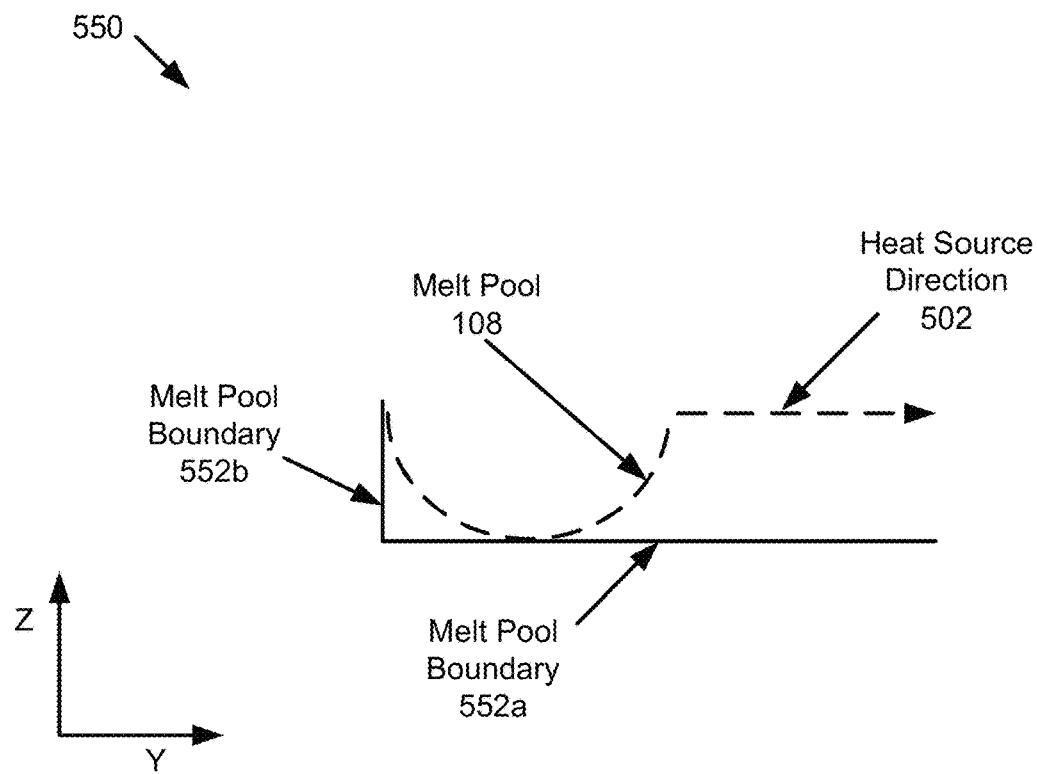
FIG. 5C is an illustration of an example of assigning melt pool boundaries to the YZ plane of a manufactured article in accordance with embodiments of the disclosure.

FIG. 5C is an illustration 550 of an example of assigning melt pool boundaries to the YZ plane of a manufactured article in accordance with embodiments of the disclosure. In illustration 550, melt pool boundaries 552*a, b* are assigned to the YZ plane of the manufactured article, where melt pool boundary 552*a* is along the Y-axis of the manufactured article and melt pool boundary 552*b* is along the Z-axis of the manufactured article. The melt pool boundaries 552*a, b* may indicate dimensional constraints for the melt pool 108 with respect to the YZ plane during the additive manufacturing process as the heat source generated by the energy source travels along heat source direction 502 at the top surface of the manufactured article.

Figure 5D:
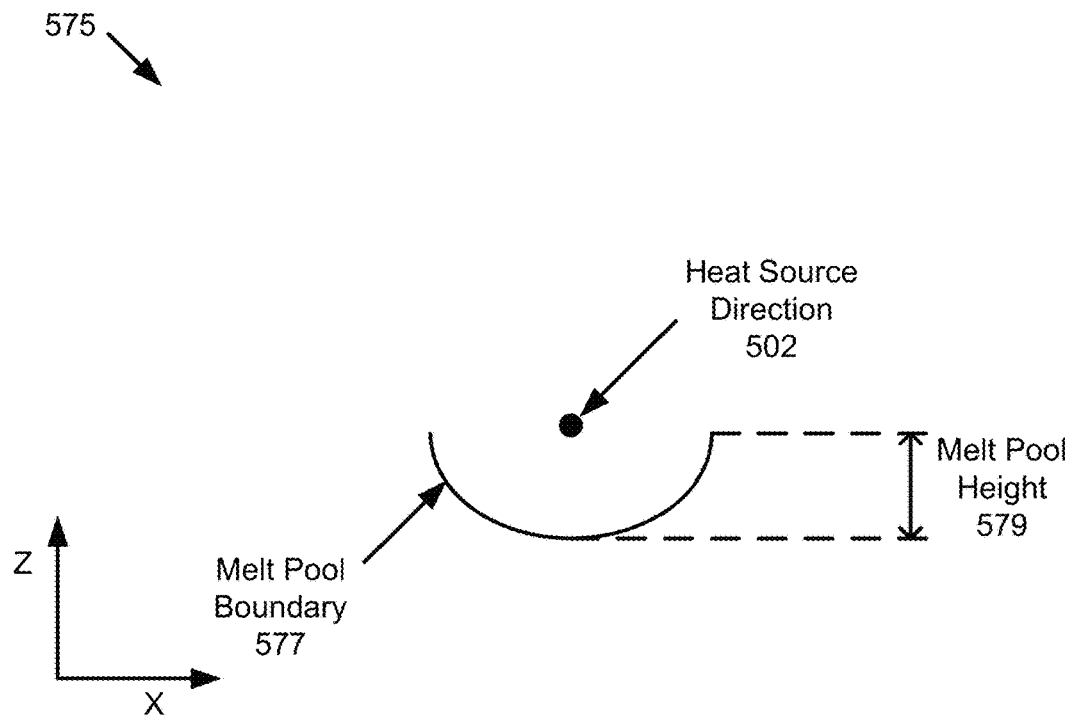
FIG. 5D is an illustration of an example of assigning melt pool boundaries to the XZ plane of a manufactured article in accordance with embodiments of the disclosure.

FIG. 5D is an illustration 575 of an example of assigning melt pool boundaries to the XZ plane of a manufactured article in accordance with embodiments of the disclosure. Based on melt pool height 579 that is determined by a thermal solver application, melt pool boundary 577 is assigned to the XZ plane of the manufactured article. Melt pool boundary 577 may be an elliptical boundary that serves as a dimensional constraint on the elliptical shape of the melt pool (not shown). In illustration 575, heat source direction 502 is orthogonal to the surface of illustration 575 (e.g., the heat source direction is directed into or out of illustration 575).

Figure 6A:
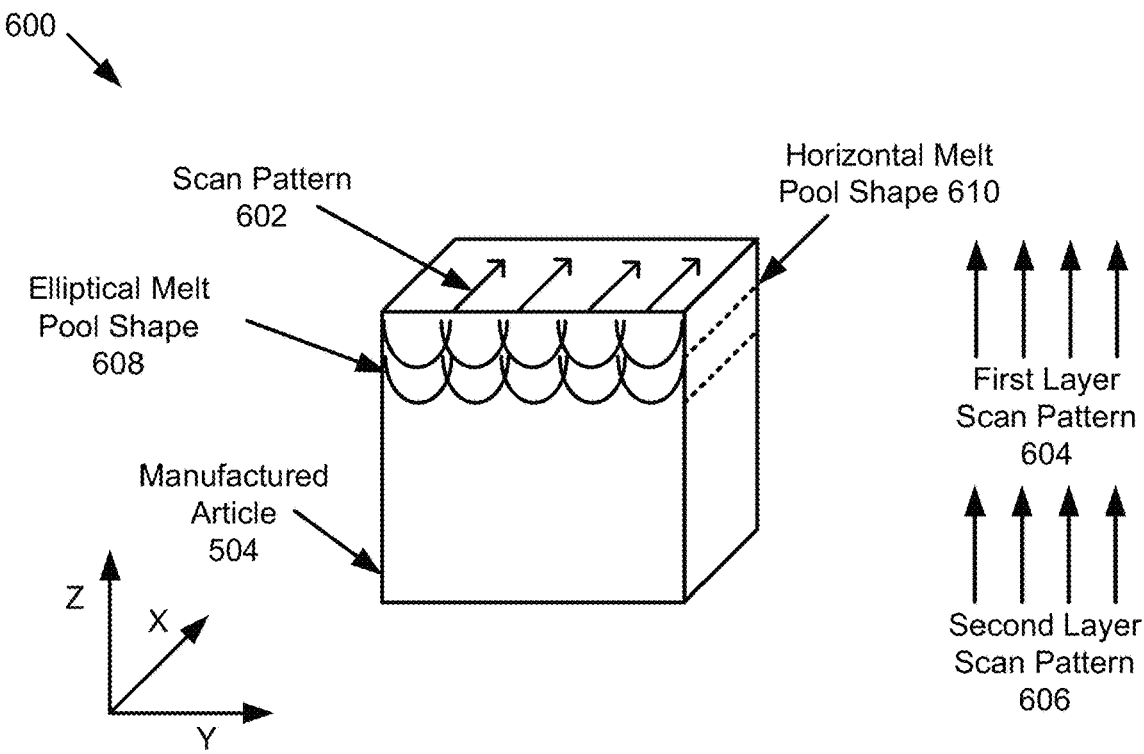
FIG. 6A is an illustration of an example of defining melt pool boundary shapes for a first type of scan pattern in accordance with some embodiments of the disclosure.

FIG. 6A is an illustration 600 of an example of defining melt pool boundary shapes for a first type of scan pattern in accordance with some embodiments of the disclosure. As previously described, scan pattern 602 may be a pattern of scan lines, where each scan line represents the travel path of the heat source during a 3D printing process of a manufactured article 504. In illustration 600, both the first layer scan pattern 604 and the second layer scan pattern 606 include scan lines traveling in the same direction. Accordingly, the melt pool shape for both the first layer and the second layer is an elliptical melt pool shape 608 with respect to the YZ plane. For the XZ plane, the melt pool shape for both the first layer and the second layer is a horizontal melt pool shape 610.

Figure 6B:
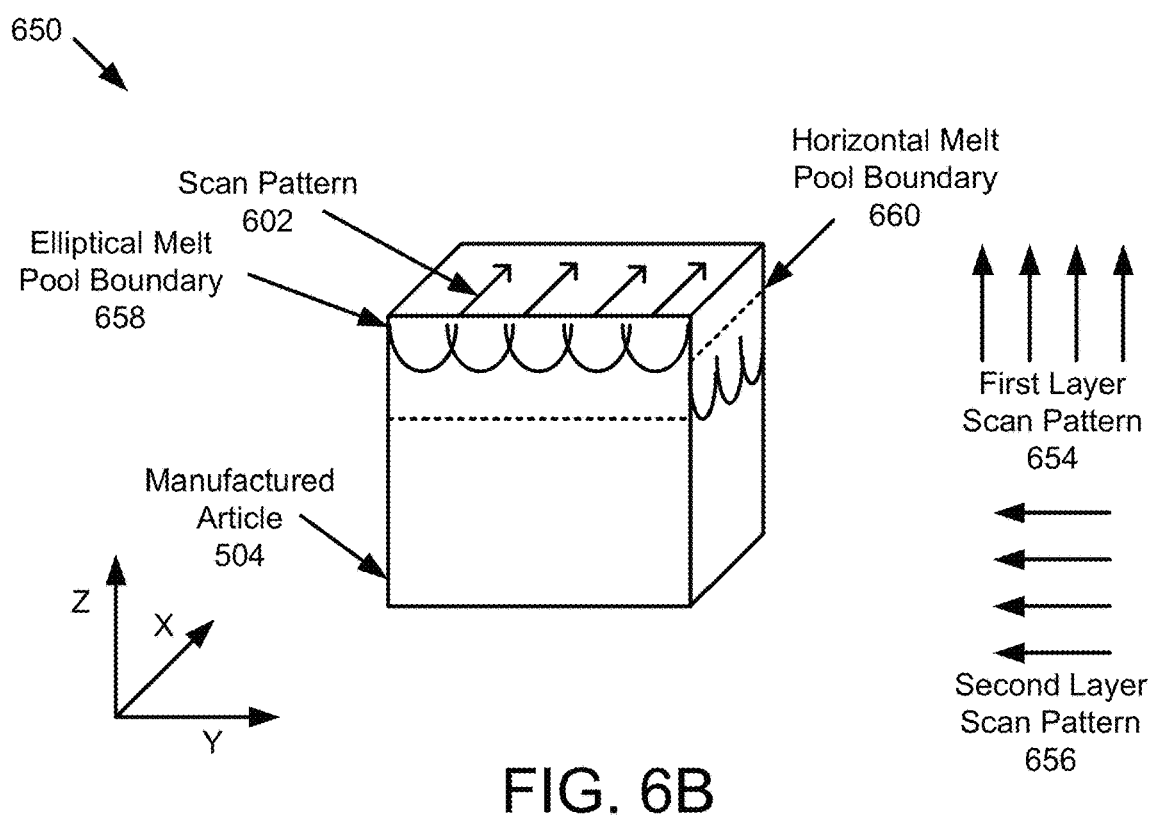
FIG. 6B is an illustration of an example of defining melt pool boundary shapes for a second type of scan pattern in accordance with some embodiments of the disclosure.

FIG. 6B is an illustration 650 of an example of defining melt pool boundary shapes for a second type of scan pattern in accordance with some embodiments of the disclosure. Elements of FIG. 6B may be similar to the elements described at FIG. 6A. However, in illustration 650, the scan lines of second layer scan pattern 656 are rotated 90 degrees with respect to the scan lines of the first layer scan pattern 654. Accordingly, the melt pool shape for the first layer is an elliptical melt pool shape 658 with respect to the YZ plane and a horizontal melt pool shape 660 for the XZ plane. Because the second layer scan pattern 656 is rotated 90 degrees with respect to the first layer scan pattern 654, the melt pool shape for the second layer is a horizontal melt pool shape 660 with respect to the YZ plane and an elliptical melt pool shape 658 for the XZ plane.

Figure 7A:
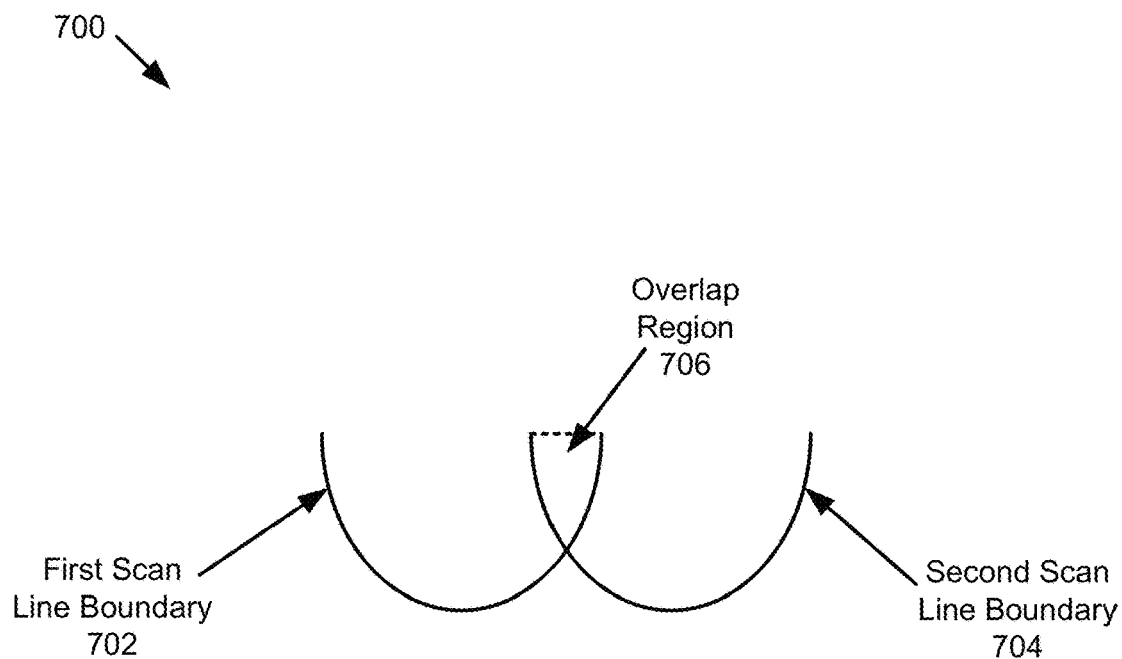
FIG. 7A is an illustration of an example of assembling a melt pool boundary by utilizing melt pool boundary information of an adjacent scan line in accordance with embodiments of the disclosure.

FIG. 7A is an illustration 700 of an example of assembling a melt pool boundary by utilizing melt pool boundary information of an adjacent scan line in accordance with embodiments of the disclosure. In illustration 700, first scan line boundary 702 may correspond to a melt pool boundary for a first scan line of a scan pattern and second scan line boundary 704 may correspond to a melt pool boundary for a second scan line of a scan pattern that is adjacent to the first scan line. Between the first scan line boundary 702 and the second scan line boundary 704 may be an overlap region 706 where re-melting of the 3D printing material may occur. Accordingly, when assembling a melt pool boundary for the second scan line, as described at blocks 306 and 318 of FIG. 3, the second scan line boundary 704 may be modified based on the characteristics associated with the first scan line. For example, the second scan line boundary 704 may be modified based on the re-melting of the 3D printing material in the overlap region 706 as well as the characteristics, such as the orientation and composition of the 3D printing material, generated for the first scan line.

Figure 7B:
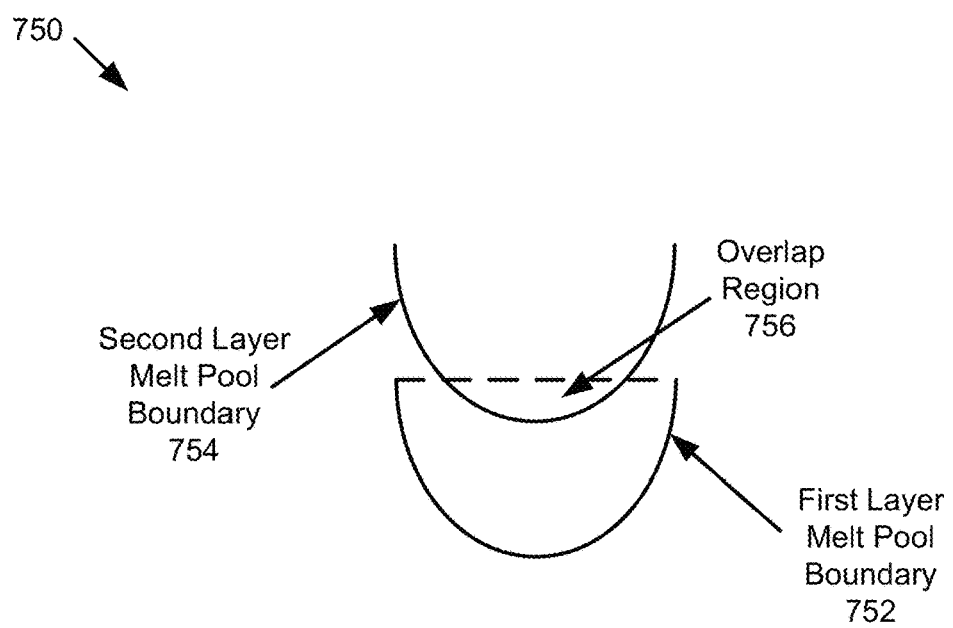
FIG. 7B is an illustration of an example of assembling a melt pool boundary by utilizing melt pool boundary information of an adjacent layer in accordance with embodiments of the disclosure.

FIG. 7B is an illustration 750 of an example of assembling a melt pool boundary by utilizing melt pool boundary information of an adjacent layer in accordance with embodiments of the disclosure. Illustration 750 may include similar elements as FIG. 7A. However, rather than illustrating melt pool boundaries of adjacent scan lines, illustration 750 includes melt pool boundaries of adjacent layers of a 3D printing process. First layer melt pool boundary 752 may correspond to a melt pool boundary for a scan line of a first layer of a 3D printing process and second layer melt pool boundary 754 may correspond to a melt pool boundary for a second scan line of a second layer of a 3D printing process. Between the first layer melt pool boundary 752 and the second layer melt pool boundary 704 may be an overlap region 756 where re-melting of the 3D printing material may occur. Accordingly, when assembling a melt pool boundary for the second layer, the second layer melt pool boundary 754 may be modified based on the characteristics associated with the first layer. For example, the second layer melt pool boundary 754 may be modified based on the re-melting of the 3D printing material in the overlap region 756 as well as the characteristics, such as the orientation and composition of the 3D printing material, generated for the first layer.

Figure 8:
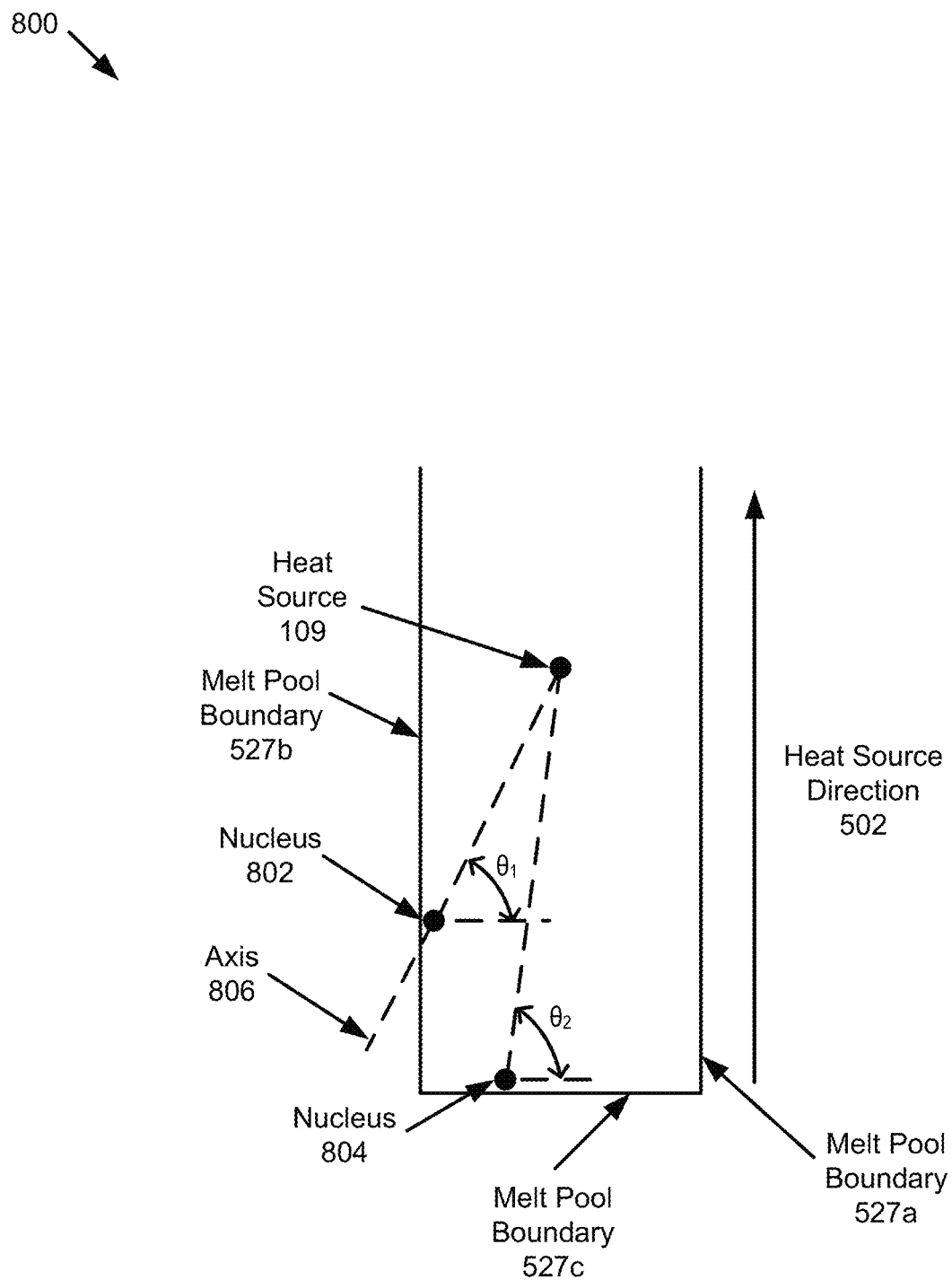
FIG. 8 is an illustration of an example of assigning growth orientations to new nuclei of a manufactured article in accordance with embodiments of the disclosure.

FIG. 8 is an illustration 800 of an example of assigning growth orientations to new nuclei of a manufactured article in accordance with embodiments of the disclosure. In illustration 800, growth orientations are assigned to nucleus 802 and nucleus 804 located at or near melt pool boundaries 527a-c of the XY plane, as previously described at FIG. 5B. Nucleus 802 and nucleus 804 may correspond to new nuclei (e.g., grains) of the 3D printing material. Nucleus 802 may be assigned a first growth orientation (e.g., $\theta_1$) that corresponds to the angle between nucleus 802 and heat source 109. Nucleus 804 may be assigned a second growth orientation (e.g., $\theta_2$) that corresponds to the angle between nucleus 804 and heat source 109. The growth orientations assigned to nucleus 802 and nucleus 804 may correspond to the angles between the nuclei and heat source 109 at a particular time during the additive manufacturing process and may be a fixed value until solidification of the 3D printing material is complete, as previously described at FIG. 2.

The growth orientations assigned to the nuclei may correspond to the growth behavior of the nuclei relative to the location of heat source 109. For example, if the growth orientation for nucleus 802 is $\theta_1$=70 degrees relative to heat source 109, then the growth of nucleus 802 may be along an axis 806 that is 70 degrees relative to heat source 109. Although FIG. 8 illustrates assigning a first growth orientation to a first nucleus and a second growth orientation to a second nucleus, embodiments of the disclosure may assign any number of growth orientations to any number of corresponding nuclei of the 3D printing material.

Figure 9:
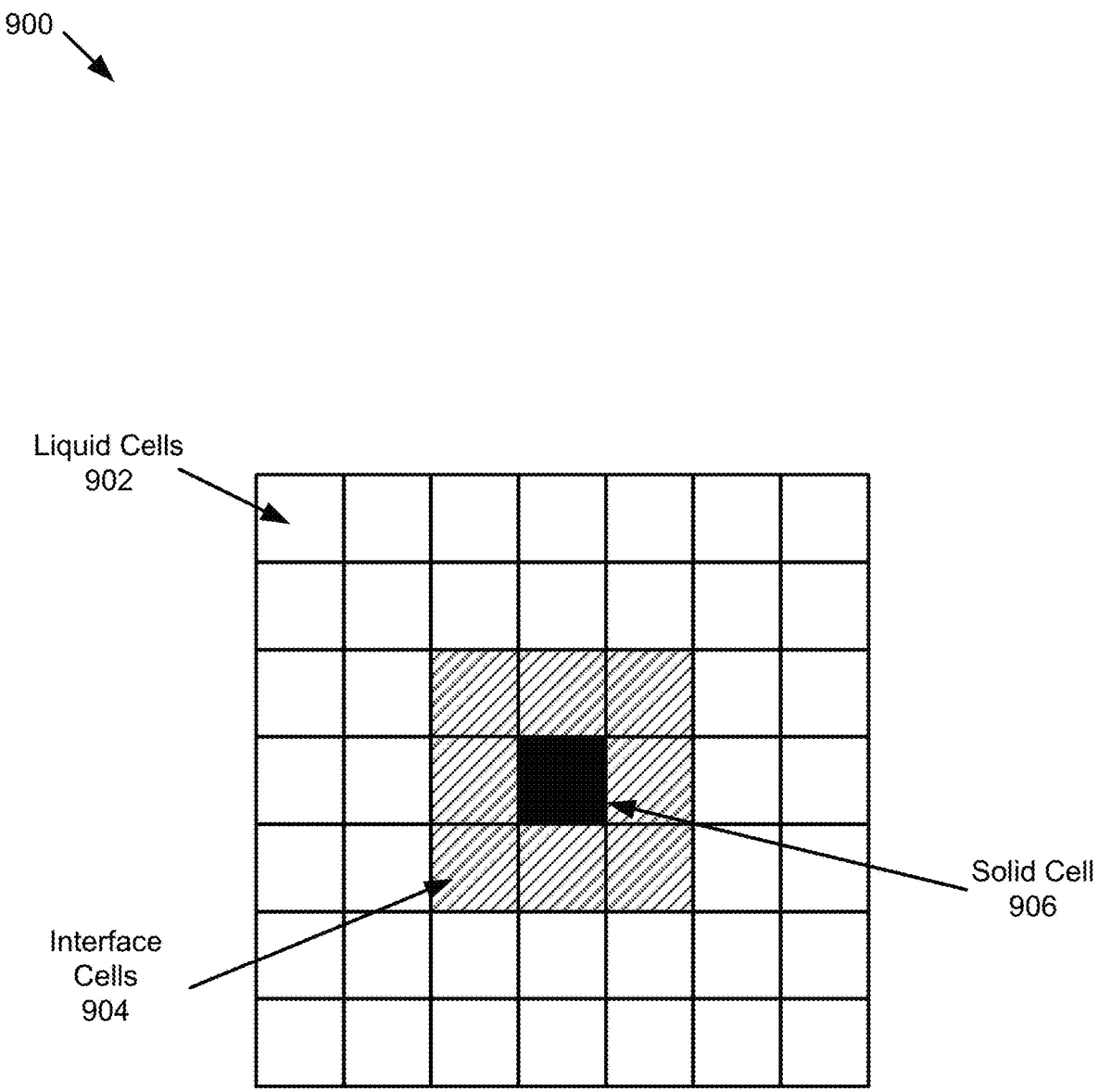
FIG. 9 is an illustration of identifying one or more interface cells within a concentration field of 3D printing material in accordance with some embodiments of the disclosure.

FIG. 9 is an illustration of identifying one or more interface cells within a concentration field 900 of 3D printing material in accordance with some embodiments of the disclosure. As previously described, concentration field 900 may correspond to the diffusion of the solid and liquid portions across an area of the 3D printing material. Referring to FIG. 9, the concentration field 900 includes a solid cell 906 located at the center of the concentration field 900 that corresponds to a portion of the 3D printing material that is in a solid state. The concentration field 900 further includes liquid cells 902 located at the periphery of the concentration field 900 that corresponds to a portion of the 3D printing material that is in a liquid state. Referring to FIG. 9, each of the cells may correspond to a predetermined volume of 3D printing material and may form a grid over a larger volume of the 3D printing material.

The concentration field 900 further includes one or more interface cells 904 that are located between the portion of the 3D printing material including liquid cells 902 and the portion of the 3D printing material including solid cells 906 of concentration field 900. In embodiments, a first portion of the each interface cells 904 may be in a liquid state and a second portion of each of the interface cells 904 may be in a solid state. A solid fraction may be determined for each of the interface cells 904 that correspond to a first amount of 3D printing material in a particular interface cell that is in a solid state relative to the total amount of 3D printing material in the particular interface cell, as previously described. In embodiments, at least a portion of the simulation process may be iteratively performed until all of the interface cells 904 are in a solid state.

Figure 10:
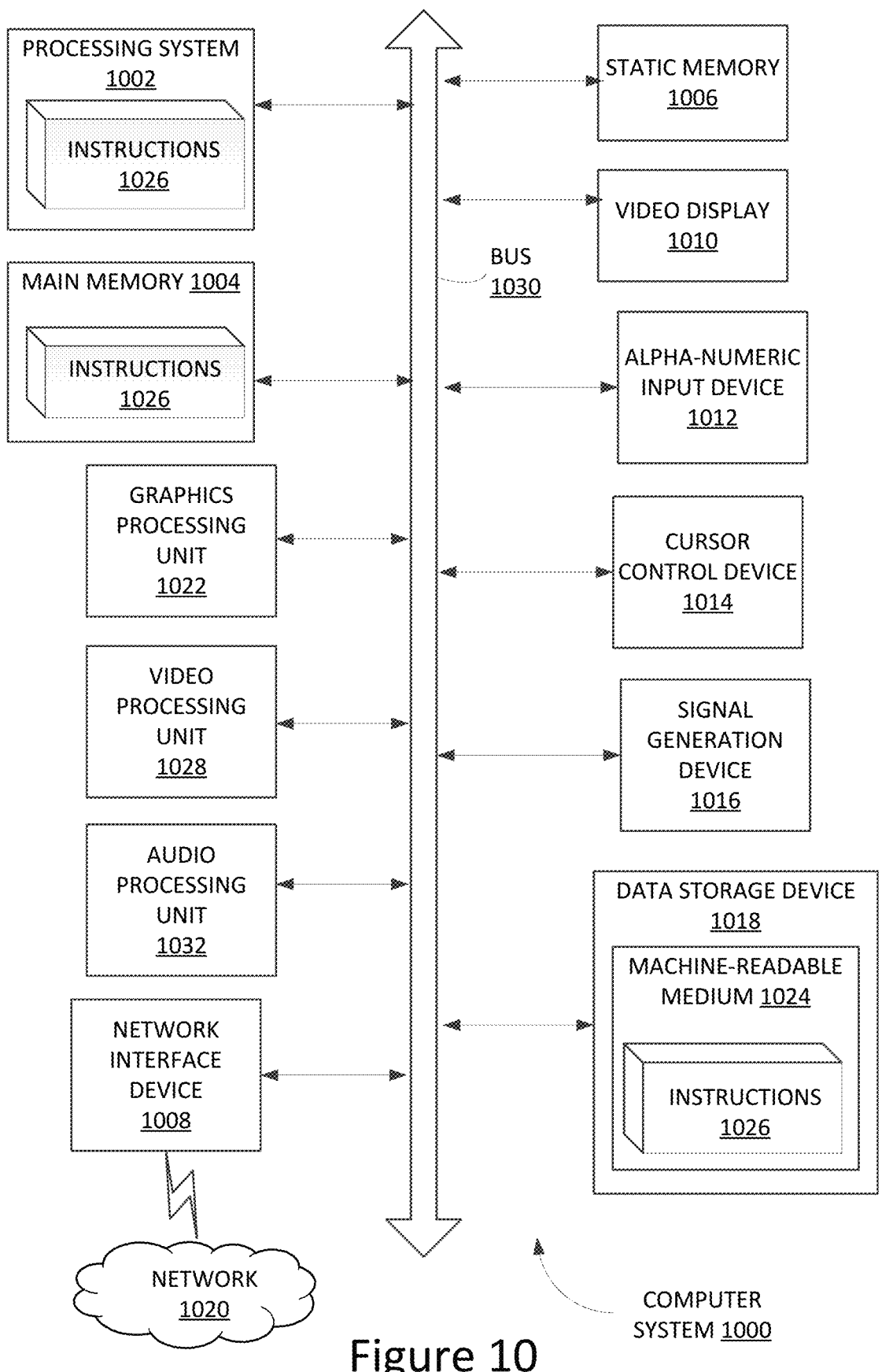
FIG. 10 illustrates an illustrative computer system operating in accordance with one or more aspects of the present disclosure.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may correspond to the computer system 103 of FIG. 1. In some embodiments of the present invention, the machine may be connected (e.g., networked) to other machines (e.g., other computer systems in a network with computer system 103) in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In some embodiments, computer system 1000 may be implemented in a cloud-based platform.

The exemplary computer system 1000 includes a processing system 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory (e.g., a data storage device), which communicate with each other via a bus 1030.

The processing system 1002 represents one or more processors such as a microprocessor, central processing unit, or the like. The term "processing system" is used herein to refer to any combination of one or more integrated circuits and/or packages that include one or more processors (e.g., one or more processor cores). Therefore, the term processing system encompasses a single core CPU (computer processing unit), a multi-core CPU and a massively multi-core system that includes many interconnected integrated circuits, each of which may include multiple processor cores. The processing system 1002 may therefore include multiple processors. The processing system 1002 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing system 1002 may also be one or more special-purpose processing devices such as an application specific integrated circuit (ASIC), a field programmable gate array (FPGA), a digital signal processor (DSP), network processor, system on chip (SoC), or the like. The computer system 1000 may include a graphics processing unit 1022, a video processing unit 1028, and an audio processing unit 1032.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium (or more specifically a computer-readable storage medium) 1024 on which is stored one or more sets of instructions 1026 embodying any one or more of the methodologies or functions described herein. The instructions 1026 may also reside, completely or at least partially, within the main memory 1004 and/or within the processing system 1002 during execution thereof by the computer system 1000, the main memory 1004 and the processing system 1002 also constituting machine-readable storage media. Main memory 1004 or data storage device 1018 may include a shared memory space for communication between various components executed by instructions as described herein.

While the computer-readable storage medium 1024 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies disclosed herein. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various computer systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A method comprising:
   receiving, by a simulation model, a thermal gradient and a cooling rate associated with a 3D printing material as inputs for the simulation model, wherein the simulation model provides information about a microstructure associated with the 3D printing material, and wherein the thermal gradient comprises a representation of temperature variation across a volume of the 3D printing material, after the 3D printing material has been heated, based on a composition of the 3D printing material; and
   generating, by the simulation model executed by a processing system, characteristics associated with the 3D printing material as outputs of the simulation model based on the thermal gradient and the cooling rate associated with the 3D printing material.

2. The method of claim 1, further comprising:
   determining whether a manufactured article fabricated by a 3D printing process associated with the simulation model is within a desired specification based on the generated characteristics associated with the 3D printing material;
   in response to determining that the manufactured article is not within the desired specification, adjusting one or more parameters associated with the 3D printing process; and
   providing the one or more adjusted parameters to the simulation model.

3. The method of claim 1, wherein the characteristics associated with the 3D printing material comprise at least one of an orientation of the 3D printing material, a composition of the 3D printing material, a grain size of the 3D printing material, a morphology of the 3D printing material or a concentration(s) of component(s) in the 3D printing material.

4. The method of claim 1, wherein the simulation model is executed on at least one layer of a manufactured article and wherein the inputs for the simulation model further include data representing one or more scan patterns of a beam used to heat the 3D printing material.

5. The method of claim 1, wherein generating the characteristics associated with the 3D printing material further comprises:
   simulating nucleation on the 3D printing material based on the thermal gradient and the cooling rate associated with the 3D printing material.

6. The method of claim 1, wherein generating the characteristics associated with the 3D printing material further comprises:
   assigning a growth orientation to new nuclei of the 3D printing material based on a heat source position and movement.

7. The method of claim 1, wherein generating the characteristics associated with the 3D printing material further comprises:
   identifying an interface cell associated with the 3D printing material, wherein the interface cell is in contact with a liquid portion of the 3D printing material and a solid portion of the 3D printing material.

8. A data processing system for simulating a 3D printing system comprising:
   a memory; and
   a processing system executing a 3-dimensional (3D) simulation model, operatively coupled to the memory, to:
      receive, by the 3D simulation model, a thermal gradient and a cooling rate associated with a 3D printing material as inputs for the 3D simulation model, wherein the simulation model provides information about a microstructure associated with the 3D printing material, and wherein the thermal gradient comprises a representation of temperature variation across a volume of the 3D printing material, after the 3D printing material has been heated, based on a composition of the 3D printing material; and generate, by the 3D simulation model executed by the processing system, characteristics associated with the 3D printing material as outputs of the 3D simulation model based on the thermal gradient and the cooling rate associated with the 3D printing material.

9. The data processing system of claim 8, further comprising:
one or more energy sources, operatively coupled to the processing system, to generate one or more heat sources; and
a scanner, operatively coupled to the one or more energy sources and the processing system, to direct the one or more heat sources to an area of the 3D printing material and wherein the inputs for the simulation model further include data representing one or more scan patterns of a beam used to heat the 3D printing material.

10. The data processing system of claim 8, further comprising:
one or more sensors, operatively coupled to the processing system, to provide data associated with the 3D simulation model to the processing system.

11. The data processing system of claim 8, wherein the processing system is further to:
simulate nucleation on the 3D printing material based on the thermal gradient and the cooling rate associated with the 3D printing material.

12. The data processing system of claim 8, wherein the processing system is further to:
assign a growth orientation to new nuclei of the 3D printing material based on a heat source position and movement.

13. The data processing system of claim 8, wherein the processing system is further to:
determine whether a manufactured article fabricated by a 3D printing process associated with the simulation model is within a desired specification based on the generated characteristics associated with the 3D printing material;
in response to determining that the manufactured article is not within the desired specification, adjust one or more parameters associated with the 3D printing process; and
provide the one or more adjusted parameters to the simulation model.

14. The data processing system of claim 8, wherein the characteristics associated with the 3D printing material comprise at least one of an orientation of the 3D printing material, a grain size of the 3D printing material, a morphology of the 3D printing material, a composition of the 3D printing material or a concentration(s) of component(s) in the 3D printing material.

15. A non-transitory computer-readable storage medium including instructions that, when executed by a processing system, cause the processing system to:
receive, by a simulation model, a thermal gradient and a cooling rate associated with a 3D printing material as inputs for the simulation model, wherein the simulation model provides information about a microstructure associated with the 3D printing material, and wherein the thermal gradient comprises a representation of temperature variation across a volume of the 3D printing material, after the 3D printing material has been heated, based on a composition of the 3D printing material; and
generate, by the simulation model, characteristics associated with the 3D printing material as outputs of the simulation model based on the thermal gradient and the cooling rate associated with the 3D printing material.

16. The non-transitory computer-readable storage medium of claim 15, wherein the processing system is further to:
determine whether a manufactured article fabricated by a 3D printing process associated with the simulation model is within a desired specification based on the generated characteristics associated with the 3D printing material;
in response to determining that the manufactured article is not within the desired specification, adjust one or more parameters associated with the 3D printing process; and
provide the one or more adjusted parameters to the simulation model.

17. The non-transitory computer-readable storage medium of claim 15, wherein the characteristics associated with the 3D printing material comprise at least one of an orientation of the 3D printing material, a grain size of the 3D printing material, a morphology of the 3D printing material, a composition of the 3D printing material or a concentration(s) of component(s) in the 3D printing material and wherein the inputs for the simulation model further include data representing one or more scan patterns of a beam used to heat the 3D printing material.

18. The non-transitory computer-readable storage medium of claim 15, wherein to generate the characteristics associated with the 3D printing material, the processing system if further to:
simulate nucleation on the 3D printing material based on the thermal gradient and the cooling rate associated with the 3D printing material.

19. The non-transitory computer-readable storage medium of claim 15, wherein to generate the characteristics associated with the 3D printing material, the processing system is further to:
assign a growth orientation to new nuclei of the 3D printing material based on a heat source position and movement.

20. The non-transitory computer-readable storage medium of claim 15, wherein to generate the characteristics associated with the 3D printing material, the processing system is further to:
identify an interface cell associated with the 3D printing material, wherein the interface cell is in contact with a liquid portion of the 3D printing material and a solid portion of the 3D printing material.

* * * * *